US008602958B1

(12) United States Patent
Kinney et al.

(10) Patent No.: US 8,602,958 B1
(45) Date of Patent: Dec. 10, 2013

(54) METHODS AND ASSEMBLIES FOR COLLECTING LIQUID BY CENTRIFUGATION

(75) Inventors: Patrick D. Kinney, Hayward, CA (US); Michele E. Wisniewski, San Diego, CA (US); Jon A. Hoshizaki, Cupertino, CA (US); David M. Liu, Los Altos, CA (US); Joon Mo Yang, Redwood City, CA (US)

(73) Assignee: Life Technologies Corporation, Carlsbad, CA (US)

(*) Notice: Subject to any disclaimer, the term of this patent is extended or adjusted under 35 U.S.C. 154(b) by 1162 days.

(21) Appl. No.: 12/324,655

(22) Filed: Nov. 26, 2008

Related U.S. Application Data

(60) Provisional application No. 60/991,176, filed on Nov. 29, 2007, provisional application No. 61/032,924, filed on Feb. 29, 2008.

(51) Int. Cl.
*B01D 21/26* (2006.01)

(52) U.S. Cl.
USPC .............................. 494/37; 422/548; 422/553

(58) Field of Classification Search
USPC .............. 494/37; 422/72, 130, 548, 553, 561; 210/781, 787
See application file for complete search history.

(56) References Cited

U.S. PATENT DOCUMENTS 6,479,020 B1 * 11/2002 Stanchfield et al. .......... 422/553
2005/0281719 A1 * 12/2005 Brennan ....................... 422/130

OTHER PUBLICATIONS

Diehl, Frank et al. "BEAMing: single-molecule PCR on microparticles in water-in-oil emulsions." Nature Methods (2006) 3 551-559.*

* cited by examiner

*Primary Examiner* — Walter D Griffin
*Assistant Examiner* — Timothy Cleveland

(57) ABSTRACT

Assemblies for and methods of coupling a microtiter plate and receptacle for centrifugation of liquid from the microtiter plate to the receptacle are provided. In some embodiments, a coupling frame can be used. In other embodiments, the microtiter plate couples directly to the receptacle. In some embodiments, relative motion between the receptacle and the microtiter plate is limited in the x-y plane. In some embodiments, relative motion between the receptacle and the microtiter plate is limited in the x-z plane. In some embodiments, relative motion between the receptacle and the microtiter plate is limited in the y-z plane.

29 Claims, 15 Drawing Sheets

METHODS AND ASSEMBLIES FOR COLLECTING LIQUID BY CENTRIFUGATION

CROSS REFERENCE TO RELATED APPLICATIONS

This application claims a priority benefit under 35 U.S.C. §119(e) from Patent Application No. 60/991,176 filed Nov. 29, 2007 and 61/032,924 filed Feb. 29, 2008, which are incorporated herein by reference.

FIELD

The present teachings relate to methods of collecting liquids and assemblies used in those methods.

SUMMARY

Liquid contained in wells of a microtiter plate can be centrifuged out and collected in a single volume in a receptacle facing the microtiter plate in a microtiter plate centrifuge. Further processing of the liquid, for example, mixing it with another liquid can be performed in the receptacle with greater ease.

BRIEF DESCRIPTION OF THE DRAWINGS

The skilled artisan will understand that the drawings described below are for illustrative purposes only. The drawings are not intended to limit the scope of the present teachings in any way.

DESCRIPTION

Figure 1:
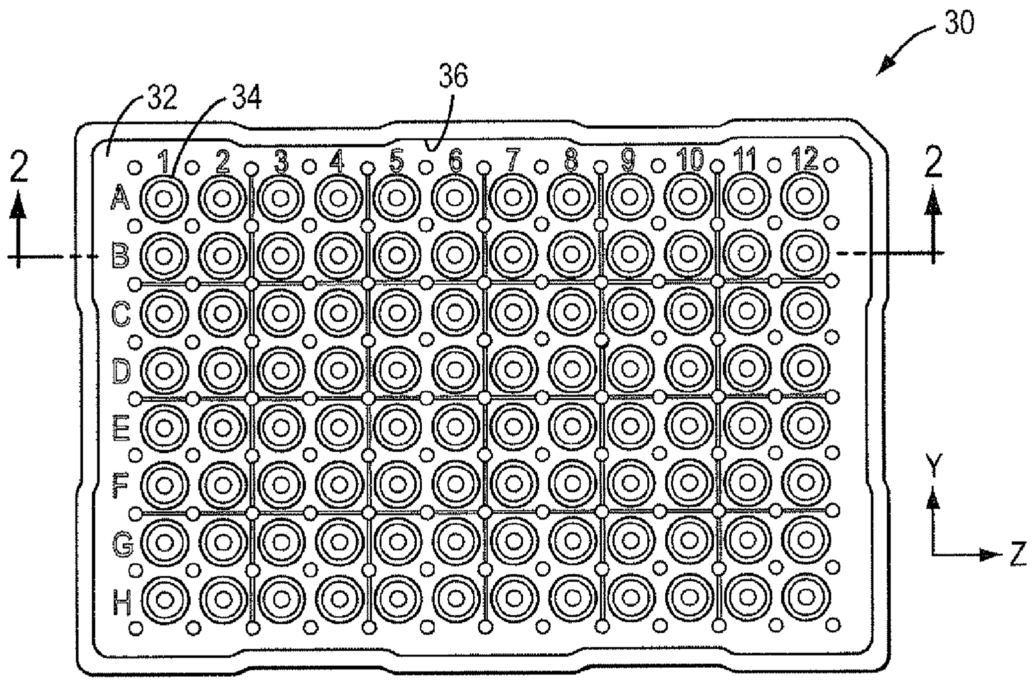
FIG. 1 illustrates a top view of a 96 well microtiter plate.

After thermally cycling a microtiter plate of liquid to amplify nucleic acids contained in the liquid, further processing may be required for the liquid in each well. In various embodiments, thermally cycling the liquid permits amplification of the nucleic acid through the polymerase chain reaction. A thermal cycler typically used for thermally cycling microtiter plates includes, for example, the AB 9700. In various embodiments, each well may have the same liquid and combination of the individual, discrete volumes of liquid in each well may simplify the further processing. In various embodiments, the liquid in each well has a viscosity higher than that of water, such that gravity will not cause all, or in some cases even any of the liquid to flow out of the microtiter plate if it is tilted or turned upside down.

As an example, the liquid in each of the wells of the microtiter plate may be an emulsion. In various embodiments, the emulsion may be a monodisperse water-in-oil emulsion. In various embodiments, the discontinuous phase of the emulsion can have a range of droplet sizes. In various embodiments, the emulsion is a water-in-oil emulsion with a plurality of the discontinuous volumes of water containing among other things a bead to which the amplified nucleic acid will attach.

In various embodiments, the further processing may be breaking an emulsion. It may be desirable to break the emulsion to collect the bead previously encapsulated by one of the discontinuous phase droplets. In order to break the emulsion and allow the discontinuous phase to coalesce as a continuous phase, a chemical may need to be added to the emulsion. In various embodiments, the emulsion is a water-in-oil emulsion and 2-butanol is added to break the emulsion.

An example of a method to break an emulsion follows. A 50 mL reservoir is filled with an emulsion-breaking liquid. Using a multi-channel pipettor, 100 microliters are transferred into each well of a 96 well plate, where each of the 96 wells contains a volume of an emulsion after thermocycling. The tips of multi-channel pipettor are inserted into the wells and emulsion-breaking liquid and emulsion is pipetted up and down for times to mix the emulsion-breaking liquid with the emulsion. The multi-channel pipettor is then used to transfer the mix into a second 50 mL reservoir.

In various embodiments, where the yield of beads from the microplate affects the outcome of the downstream processing, the plate may be checked for remaining beads. If beads remain in the plate, the wells may be rinsed with additional emulsion-breaking liquid to recover residual beads.

Using a larger pipetter, for example, a 10 mL serological pipette, the contents of the 50 mL reservoir is transferred into 2 separate 15 mL conical tubes. The reservoir may be rinsed with additional emulsion-breaking liquid, and this rinse volume may be used to fill each conical tube to 14 mL. The tubes may be capped and vortexed to mix the solution. The beads may then be pelleted by centrifuging at 2000×g for 5 minutes.

After pelleting, the liquid may be decanted into a waste receptacle. The tube may be inverted and placed on absorbent material to allow remaining liquid to drain from the pellet of beads for a predetermined amount of time, for example, 5 minutes.

A method of collecting liquid from a microtiter plate may be implemented in an alternative method of breaking an emulsion. A coupling frame may be placed on top of the 96-well plate that contains an individual, discrete volume of liquid in each of the wells. A receptacle may be placed facing down, such that the opening of the receptacle is opposite the top planar surface of the microplate and top openings of the 96 wells, on top of the coupling frame to form an assembly. The assembly may then be inverted such that the receptacle is on the bottom with its opening facing upwards, the microplate is on top, and the coupling frame is between them. In various embodiments, the coupling frame limits the relative motion between the microplate and the receptacle in the x-y plane. The amount of movement permitted can be adjusted by the relative sizing of the interfacing parts of the three components of the assembly. The inverted microplate, coupling frame, and receptacle may then be loaded in a microplate centrifuge and run for at least a predetermined time to centrifuge the liquid from the microtiter plate through the opening of the receptacle where it collects in a continuous volume.

In various embodiments, a method of breaking an emulsion after amplification by PCR in a microtiter plate can include the following: A coupling frame may be placed on top of the 96-well plate that contains an individual, discrete volume of emulsion in each of the wells. A receptacle may be placed facing down, such that the opening of the receptacle is opposite the top planar surface of the microplate and top openings of the 96 wells, on top of the coupling frame to form an assembly. The assembly may then be inverted such that the receptacle is on the bottom with its opening facing upwards, the microplate is on top, and the coupling frame is between. The inverted microplate, coupling frame, and receptacle may then be loaded in a microplate centrifuge and run for at least a predetermined time, for example, 2 minutes, to centrifuge (at, for example, 550×g) the liquid from the microliter plate through the opening of the receptacle where it collects in a continuous volume. The inverted assembly may then be removed from the centrifuge and the empty microtiter plate and coupling frame removed from the receptacle.

In a fume hood, 25 mLs of an emulsion-breaking liquid may be added to the receptacle with a pipetter, for example, a serological pipette. In various embodiments, where the yield of beads from the microplate affects the outcome of the downstream processing, the plate may be checked for remaining beads. If beads remain in the plate, the wells may be rinsed with additional emulsion-breaking liquid to recover residual beads, and the rinse solution poured into the receptacle. The emulsion-breaking liquid and emulsion may be pipetted until the mix is homogeneous. The mix may then be transferred to a 50 mL conical tube.

The receptacle may then be rinsed with an additional 12 mLs of emulsion-breaking liquid to retrieve any residual beads. The tube may then be capped and vortexed to mix the solution. To pellet the beads, the tube may be centrifuged at 2000×g for a predetermined time, for example, 5 minutes. The liquid may be decanted into a waste receptacle and the tube may be inverted and placed on absorbent material to drain.

Figure 2:
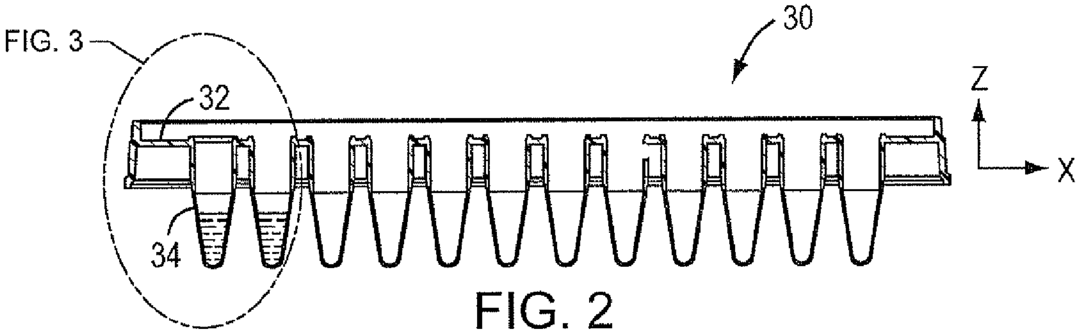
FIG. 2 illustrates a vertical cross section of a microtiter plate along line 2-2 of FIG. 1.
Figure 3:
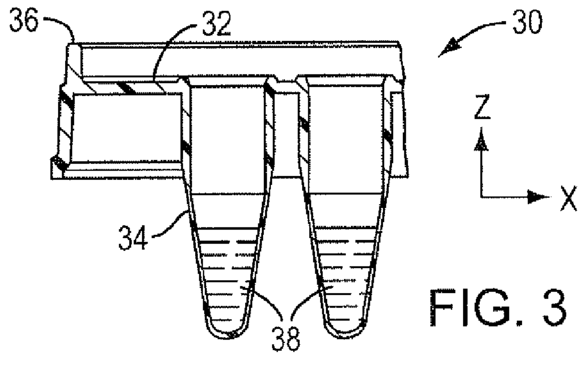
FIG. 3 is an enlarged view along line 3-3 of FIG. 2 and illustrates each of the depicted wells containing an individual, discrete volume of liquid.

The figures illustrate various embodiments of components that may be used to perform the above described method. FIGS. 1-3 illustrate a standard 96-well microtiter plate that can be used in various embodiments of the method. Microliter plates having material retention regions other than wells, such as example, through-holes, or localized surface treatments to retain a liquid may also be used. Microtiter plates having more or less than 96 wells may also be used. Examples of commonly available microplates include 48 well, 384 well, and 1536 well plates.

FIG. 1 is a top view of a 96-well microtiter plate 30 in the x-y plane. Microplate 30 has a planar surface 32 having openings therein. Each well 34 of the 96 wells of microplate 30 has a top opening in planar surface 32. Planar surface 32 also has through hole openings arrayed around each of the well top openings. In various embodiments, planar surface 32 does not have through-hole openings arrayed around each well top opening. Planar surface 32 is surrounded by a perimetric ridge 36. In various embodiments, a microtiter plate 30 does not have a perimetric ridge. An example of 96-well plates without a perimetric ridge include Axygen Scientific's half-skirt PCR microplate, # PCR-96-HS-C.

FIG. 2 is a vertical cross-sectional view along the line 2-2 of FIG. 1, illustrating letter-labeled "B" row of 12 wells 34. In various embodiments, and as illustrated in FIG. 2, perimetric ridge 36 can extend in the z direction away from planar surface 32.

FIG. 3 is an enlarged vertical cross-section view along the line 3-3 of FIG. 2, illustrating two wells 34 of the 96 wells. Each well 34 contains a volume of liquid 38. Liquid 38 can be, for example, an aqueous solution, an emulsion, or two continuous phases of immiscible liquids. In various embodiments, an emulsion can be a water-in-oil emulsion. In various embodiments, liquid 38 can have a viscosity greater than water. In various embodiments, perimetric ridge 36 can be a vertical wall having a top surface in the x-y plane.

Figure 4A:
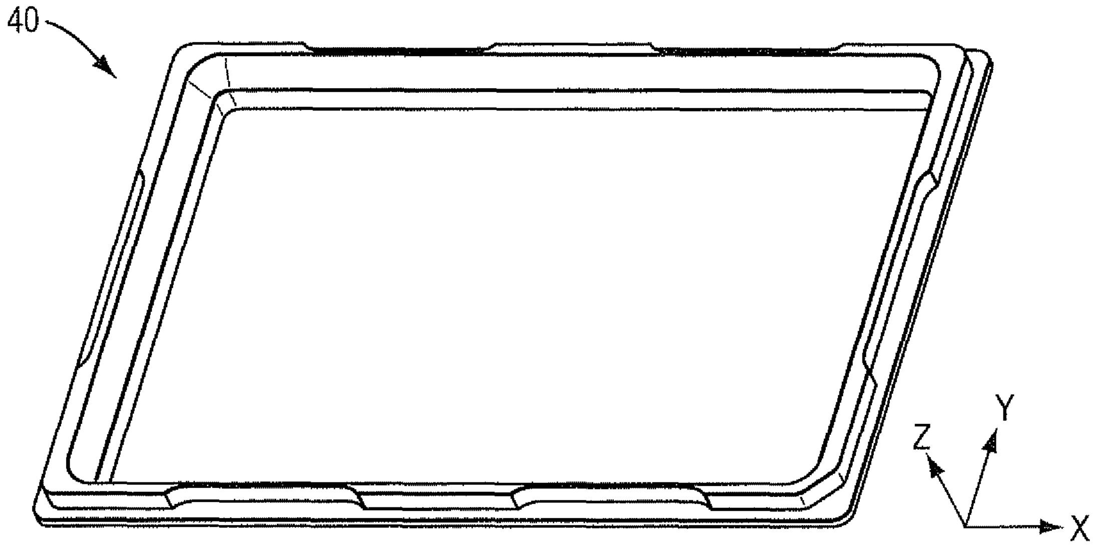
FIG. 4A illustrates a perspective view of an embodiment of a coupling frame.
Figure 4B:
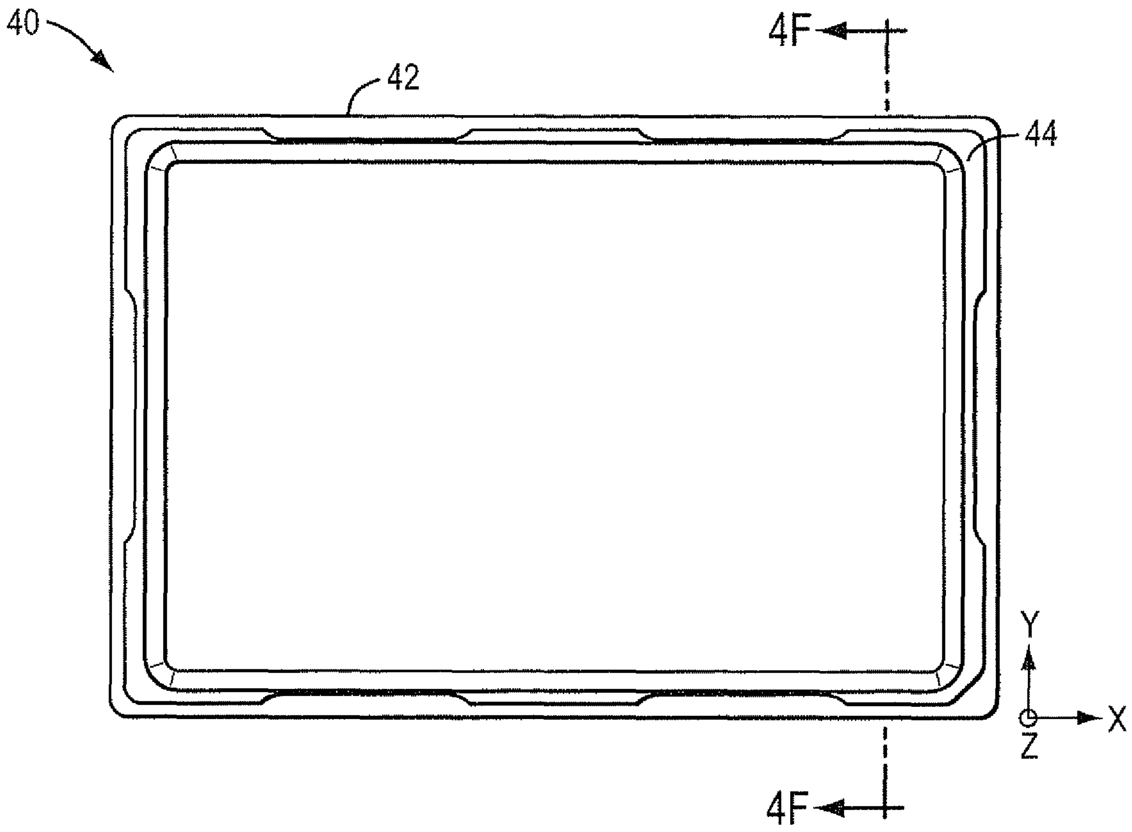
FIG. 4B illustrates a top view of an embodiment of a coupling frame.
Figure 4C:
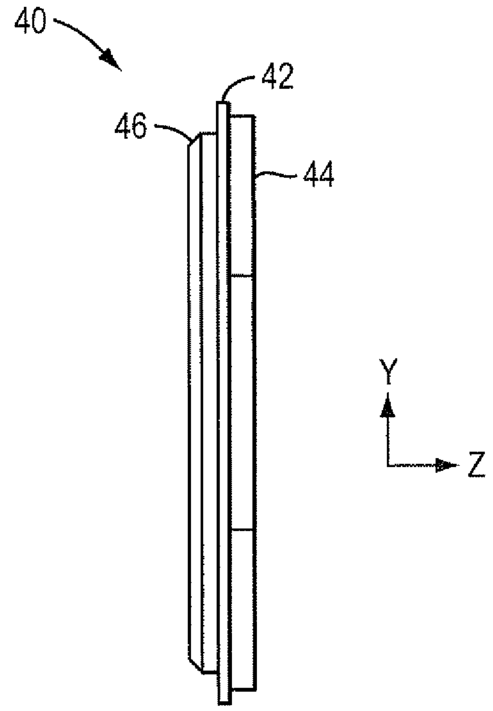
FIG. 4C illustrates a side view of the coupling frame of FIG. 4A.

FIGS. 4A-4F illustrate an embodiment of a coupling frame that can be used in various embodiments of the previously described method. FIG. 4A is a perspective view of coupling frame 40 comprising a generally ring-like structure surrounding an opening. FIG. 4B illustrates a top view of coupling frame 40 in the x-y plane. In various embodiments, coupling frame 40 can include a rectangular, planar frame 42. In various embodiments, a mechanical stop 44 projects in the z direction from rectangular, planar frame 42. In various embodiments, mechanical stop 44 is a continuous ring-like projection. In various embodiments, mechanical stop 44 is a rectangular, ring-like projection. In various embodiments, the footprint of coupling frame 40 in the x-y plane is the same as the footprint of planar surface 32 and perimeter ridge 36 of microtiter plate 30 in FIG. 1. FIG. 4C illustrates a side view in the y-z plane of coupling frame 40. In various embodiments, coupling frame 40 has a first mechanical stop 44 that projects in a first z direction and a second mechanical stop 46 that projects in a second z direction, opposite the first z direction.

Figure 4D:
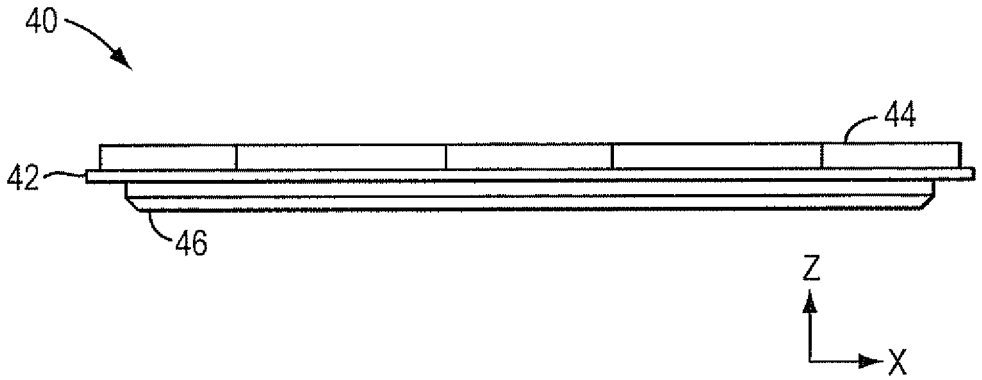
FIG. 4D illustrates a front view of the coupling frame of FIG. 4A.
Figure 4E:
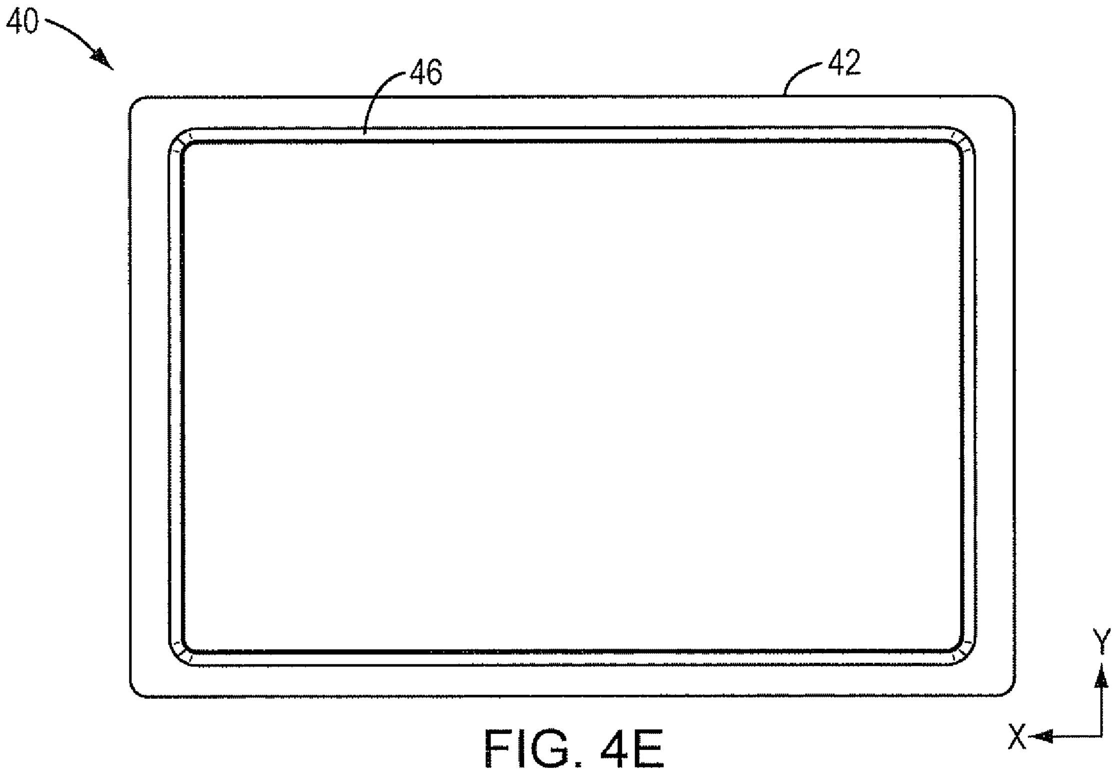
FIG. 4E illustrates a bottom view of the coupling frame of 4A.
Figure 4F:
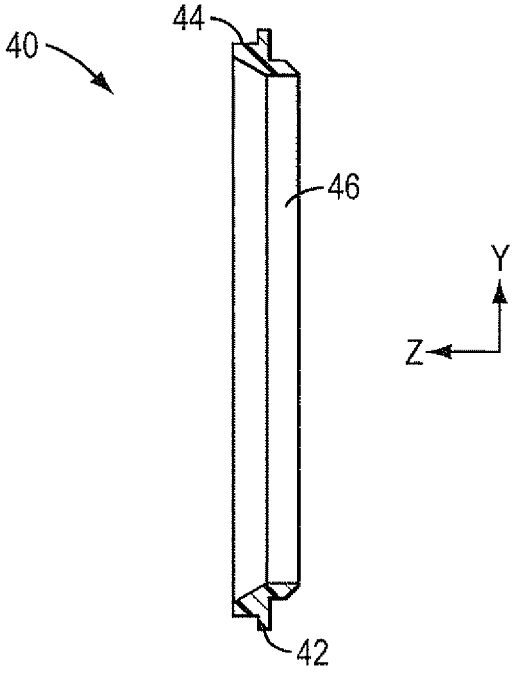
FIG. 4F illustrates a cross sectional view along the lines F-F in FIG. 4B.

In various embodiments, second mechanical stop 46 has different dimensions that first mechanical stop 44. FIG. 4D illustrates a front view in the x-z plane of coupling frame 40. FIG. 4E illustrates a bottom view in the x-y plane of coupling frame 40. In various embodiments, second mechanical stop 46 can be a continuous, ring-like projection from rectangular, planar frame 42. In various embodiments, second mechanical stop 46 can be a rectangular, ring-like projection having a vertical surface on the inside. This vertical surface can best be seen in FIG. 4F, which illustrates a cross section view in the y-z plane along line F-F of FIG. 4B. FIG. 4F illustrates best how mechanical stop 44 and mechanical stop 66 each project away from rectangular, planar frame 42, but in opposing z directions.

The mechanical stop can vary in size and shape. In various embodiments, mechanical stop 44 includes four separate projections, one to mechanically interfere with each side of microtiter plate 30 should it move in the x-y plane in relation to coupling frame 40 when assembled. In various embodiments, mechanical stop 46 includes four separate projections, one to mechanically interfere with each side of a receptacle (not shown) should it move in the x-y plane in relation to coupling frame 40 when assembled. In various embodiments, mechanical stop 44 has dimensions that would allow it to surround a perimeter of a standard microtiter plate 30. In various embodiments, mechanical stop 46 has dimensions that would allow it to surround a perimeter of a receptacle.

Figure 5:
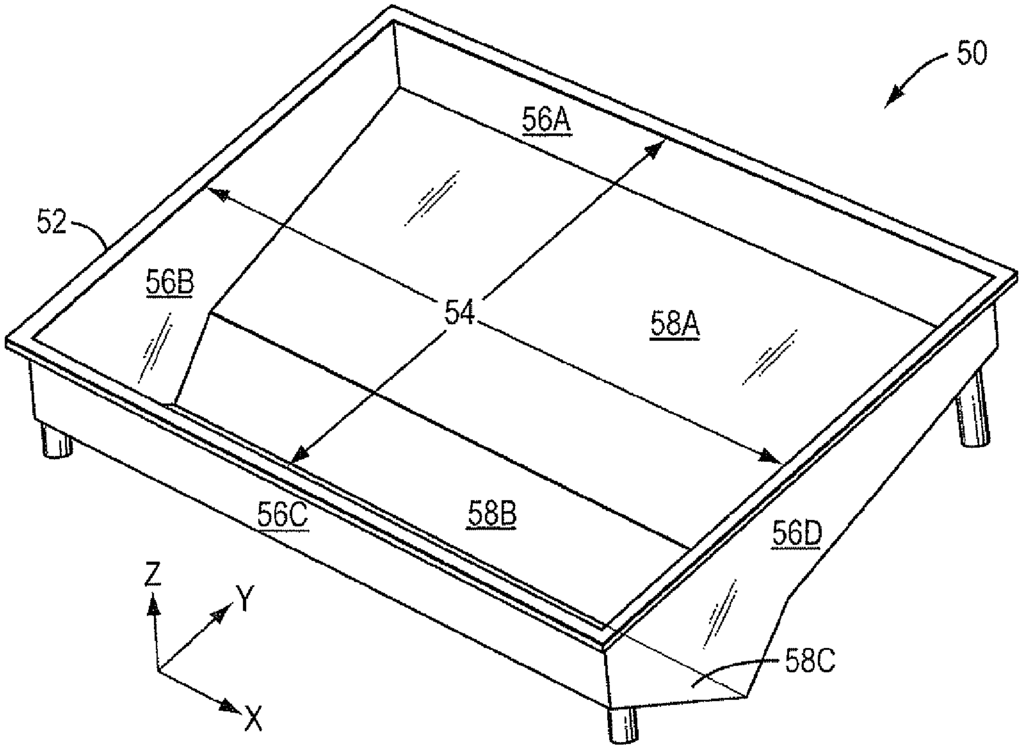
FIG. 5 illustrates a perspective view of an embodiment of a receptacle.

FIG. 5 illustrates an embodiment of a receptacle that can be used in various embodiments of the method. As illustrated in FIG. 5, receptacle 50 includes four perpendicular walls (56A-D) that join with one or more of a three part bottom wall (58A-C). In various embodiments, receptacle 50 can be a Sigma-Aldrich 175 mL reagent reservoir (part number R9259). Other commonly used reservoirs or containers may be used as the receptacles, with appropriate changes to the coupling frame. Bottom wall 58 of receptacle 50 has three sloped parts, two of which form a trough near wall 56C of receptacle 50. In various embodiments, and as illustrated in FIG. 5, receptacle 50 can stand on four posts that provide a horizontal position for opening 54 of receptacle 50. In some embodiments, and as illustrated in FIG. 5, opening 54 can be defined by perimeter wall flange 52.

Figure 6:
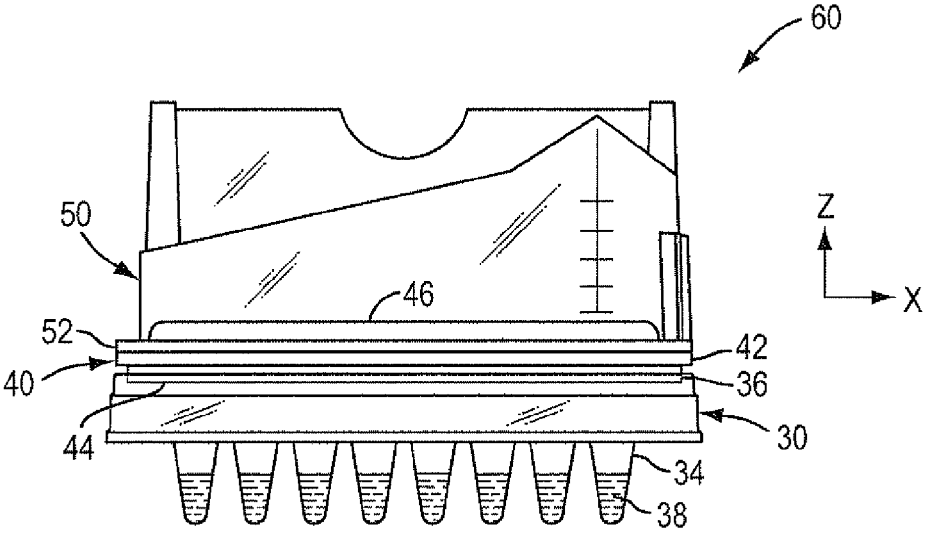
FIG. 6 illustrates a side view of an assembly of the receptacle of FIG. 5, the coupling frame of FIG. 4A-4F, and a microtiter plate.

FIG. 6 illustrates an assembly 60. As illustrated in FIG. 6, microtiter plate 30 contains an individual volume of liquid 38 in each of wells 34. Coupling plate 40 has been placed in contact with microtiter plate 30. In various embodiments, a horizontal planar surface of mechanical stop 44 contacts planar surface 32 of microplate 30. In various embodiments, a top surface of perimetric ridge 36 contacts a first side of rectangular, planar frame 42. Coupling plate 40 rests on microliter plate 30. In various embodiments, mechanical stop 44 is surrounded by perimetric ridge 36. Relative motion between coupling frame 40 and microliter plate 30 will be determined by the dimensions of the gap between mechanical stop 44 and perimetric ridge 36. In various embodiments, relative motion between coupling frame 40 and microliter plate 30 will be limited, and will stop when mechanical stop 44 and perimetric ridge 36 contact one another. In various embodiments, mechanical stop 44 projects from coupling frame 40 in the z direction inside perimetric ridge 36 of microtiter plate 30.

Figure 7:
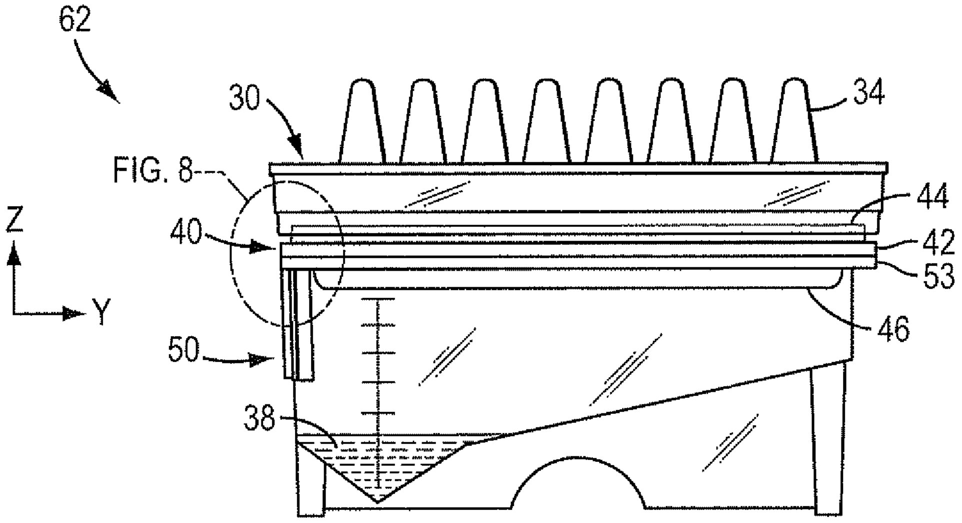
FIG. 7 illustrates the assembly of FIG. 6 inverted.

In various embodiments of the method, assembly 60 is inverted and placed in a microliter plate centrifuge. In various embodiments, liquid 38 does not immediately flow out of well 34 in the inverted position, but is held in place due to, for example, the viscosity of liquid 38, non-newtonian behavior, or surface effects such as surface tension. During centrifugation, the inertia of a body to travel in a straight line produces the motion of bodies away from the rotational axis in a radial line ("centrifugal force"). As the centrifuge spins, the bucket in which the inverted assembly 60 sits rotates up to 90 degrees and microtiter plate 30 is closest to the rotational axis and receptacle 50 is furthest from the rotational axis. Accordingly, each well 34 will empty of liquid 38 as the liquid is centrifuged through the opening in coupling frame 30 and through opening 54 of receptacle 50 until it contacts bottom wall of receptacle 50. After sufficient time at sufficient rotational speed, liquid 38 from each well of the 96-well plate will collect in receptacle 50. In various embodiments, where the liquid 38 in each well is miscible with each other, the liquid will form one continuous volume of liquid in receptacle 50. The inverted assembly can be removed from the centrifuge. FIG. 7 illustrates the assembly after centrifugation.

FIG. 7 illustrates inverted assembly 62, illustrating the single continuous volume of liquid 38 that fills the lowest point of receptacle 50. As illustrated, receptacle 50 is positioned such that opening 54 faces up. Coupling frame 40 rests on receptacle 50, and microtiter plate 30, now empty, rests upside down on coupling frame 40.

Figure 8:
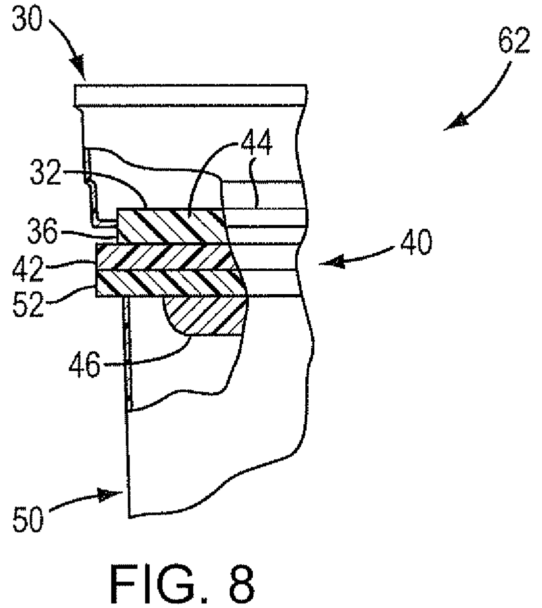
FIG. 8 illustrates a cross-sectional view along the line 8-8 of FIG. 7

In FIG. 8, coupling frame 40, where visible, is illustrated in angled lines for easily distinguishing parts of assembly 62. Mechanical stops 46 and 44, where hidden behind a wall of either microliter plate 30 or receptacle 50, are illustrated in angled dashed lines. In various embodiments, mechanical stop 46 projects downward through opening 54 into receptacle 50 and inside peripheral wall 52. In various embodiments, mechanical stop 44 projects upward and inside perimetric ridge 36 of microplate 30. In each case, the respective mechanical stop limits the range of relative motion between coupling frame 40 and either microtiter plate 30 or receptacle 50 in the x-y plane.

Figure 9:
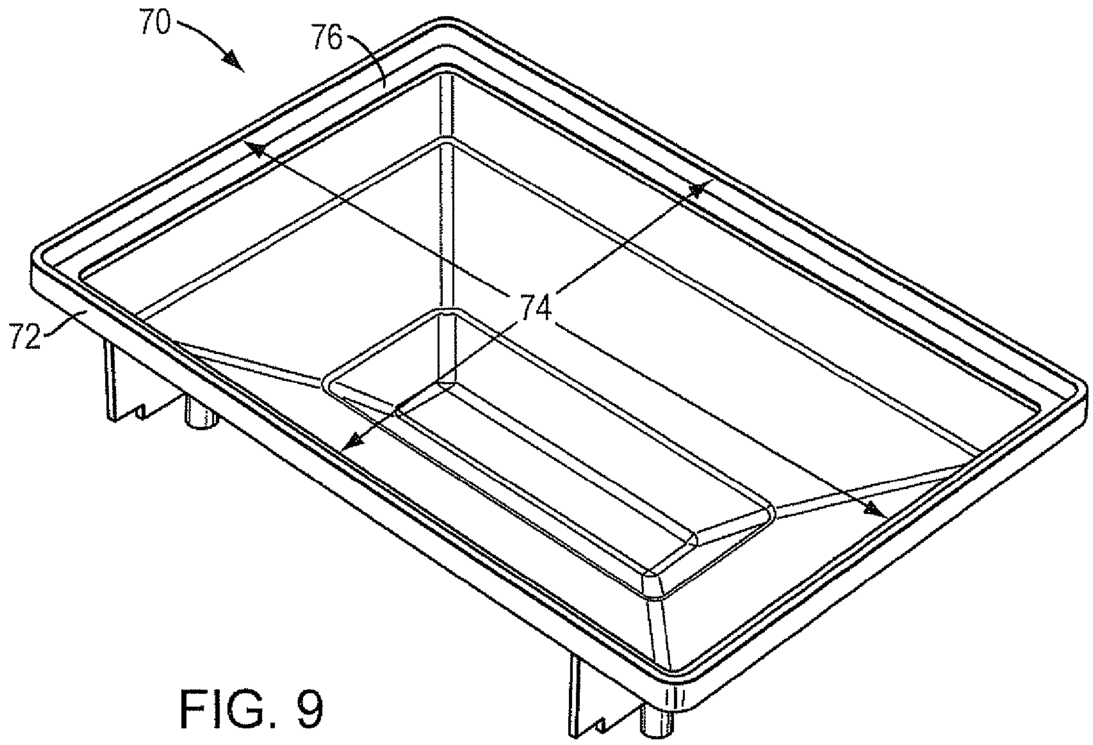
FIG. 9 illustrates a perspective view of another embodiment of a receptacle.

FIG. 9 illustrates a receptacle 70 that can be coupled to a microtiter plate 30. Receptacle 70, as illustrated, has a perimetric wall 72 that defines opening 74. Perimetric wall is dimensioned to surround the perimeter of planar surface 32 of microtiter plate, especially in those that do not have a perimetric ridge 36. Perimetric wall 72 functions as mechanical stop 46 of coupling frame 40 did. Thus, in various embodiments, receptacle 70 may be directly coupled to microtiter plate 30 without the use of a coupling frame 40. Perimetric wall 72 will limit the relative motion between receptacle 50 and microtiter plate 30 when assembled such that planar surface 32 contacts planar, annular surface 76 of receptacle 70.

Figure 10:
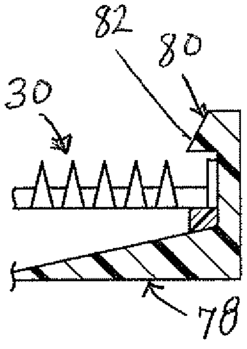
FIG. 10 illustrates a portion of an embodiment of an inverted assembly.

Receptacle 70 may be placed facing down on top of microtiter plate 30 when microtiter plate 30 has liquid 38 in wells 34. The assembly may then be inverted and placed in a microtiter plate centrifuge. During centrifugation liquid 38 will move out of well 34 and through opening 74 until it contacts a bottom wall of receptacle 70. In various embodiments, and as illustrated in FIG. 10, liquid 38 will collect and combine in a single continuous volume that will flow to the centrally located trough in receptacle 70, either under centrifugation or when removed from the centrifuge and placed on a horizontal surface for further processing of the single continuous volume of liquid.

Other embodiments of receptacles that directly couple to microtiter plates 30 may include mechanical stops projecting inside a perimeter ridge of a microtiter plate, similar to the embodiment of coupling frame 40 illustrated in FIGS. 4A-4F. An example of such a design may be understood from a figure of a modified plate (not illustrating the wells, but depicting them as holes) on page 7 of U.S. Provisional Patent, Ser. No.

60/991,167, filed Nov. 29, 2007, which is explicitly incorporated herein in its entirety by reference.

In various embodiments, receptacles directly coupled to microtiter plates for collection of liquid during centrifugation may limit the relative motion between the receptacle and the microtiter plate in the z-direction. An example of such a mechanism to do so is illustrated in FIG. 10. Initially the microtiter plate 30 would be right-side up and the receptacle 78 would be upside down facing the microtiter plate 30. By pushing the receptacle 78 onto the microtiter plate 30, the latch 80 would deflect out due to the chamfer 82 and until it passed the bottom edge of the plate skirt, where it would snap back to a vertical position and capture the plate, restricting the motion in the z-direction of the microtiter plate 30. The assembly could then be inverted and placed in a microtiter plate centrifuge. To remove the microtiter plate, the latching mechanical stops would be pressed away from the edges of the microtiter plate to allow access to remove it and then released.

Figure 11:
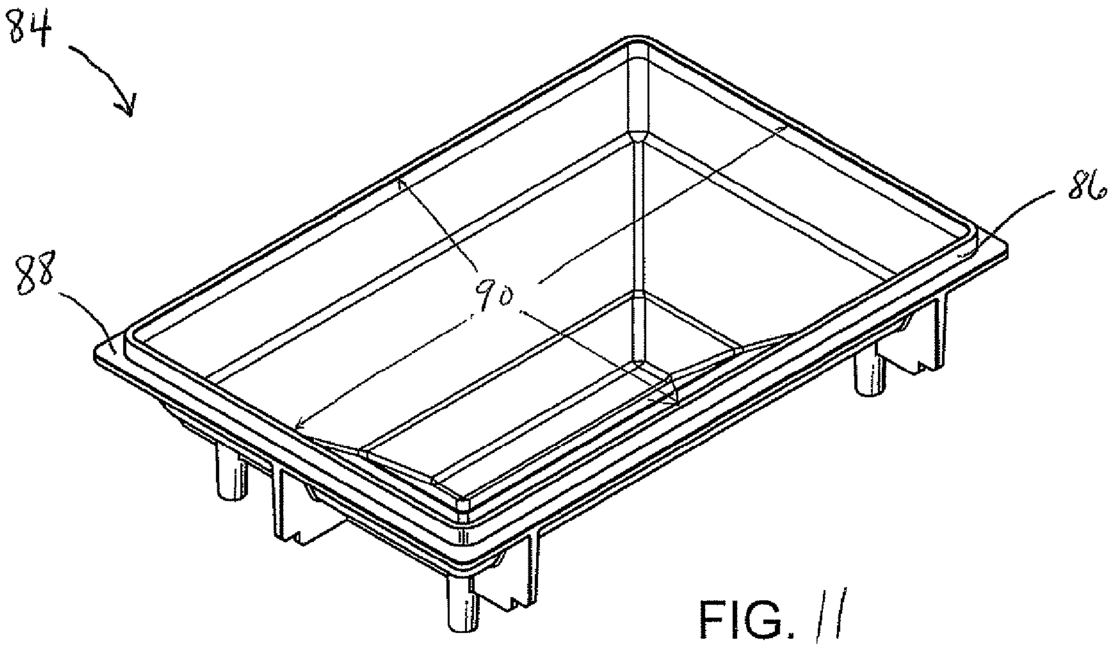
FIG. 11 illustrates a perspective view of yet another embodiment of a receptacle.
Figure 15:
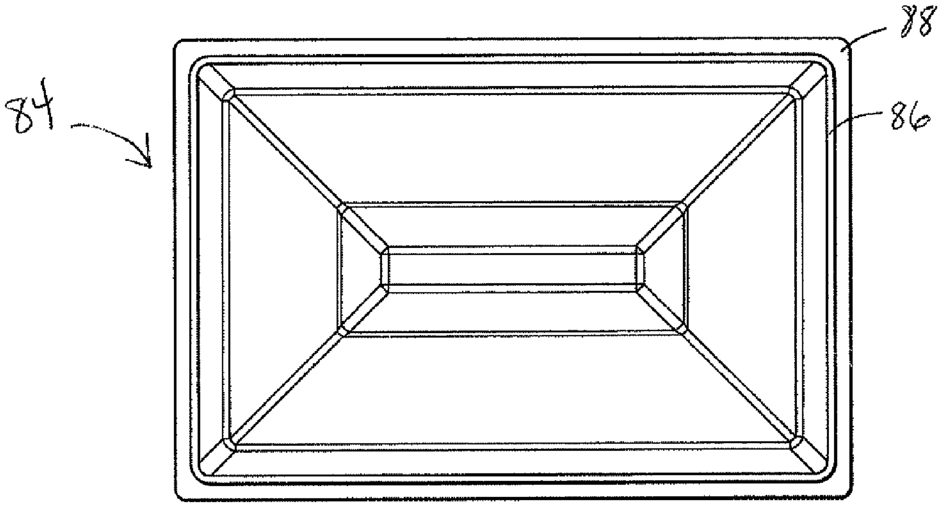
FIG. 15 illustrates a top view of the receptacle of FIG. 13.

FIG. 11 illustrates receptacle 82 which differs from receptacle 70 if FIG. 9 in that the annular surface 88 is on the perimeter and a vertically projecting wall 86 is inside, framing the opening 90 of receptacle 84. In this way, receptacle 84 is similar to coupling frame 40, as best seen when comparing FIGS. 11 and 15 with FIG. 4E. When assembled to a microtiter plate 30, receptacle 82 is limited in motion relative to microtiter plate 30 by the vertically projecting wall 86, just as mechanical stop 46 functions to limit the relative motion between receptacle 50 and microtiter plate 30.

Figure 12:
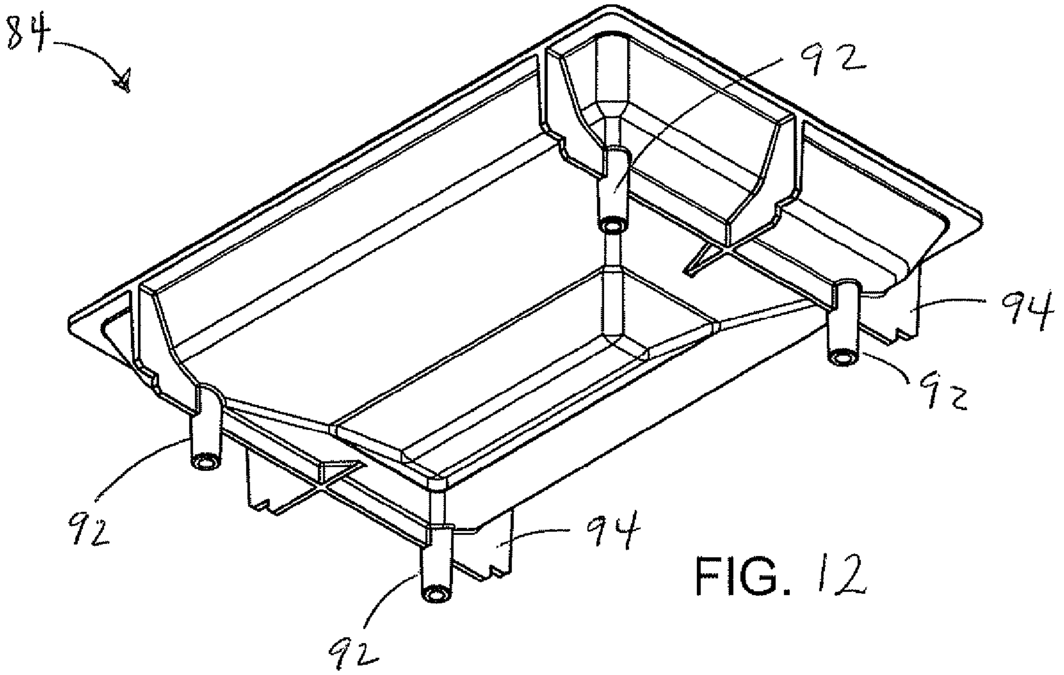
FIG. 12 illustrates another perspective view of the embodiment of FIG. 11.
Figure 16:
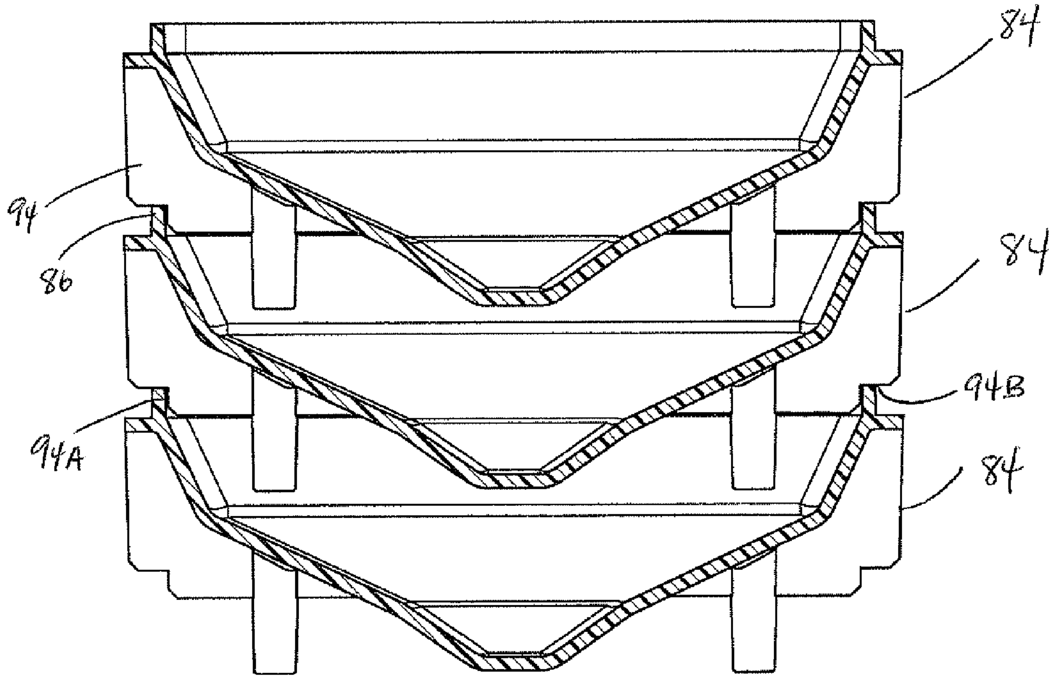
FIG. 16 illustrates three stacked receptacles of FIG. 13.
Figure 17:
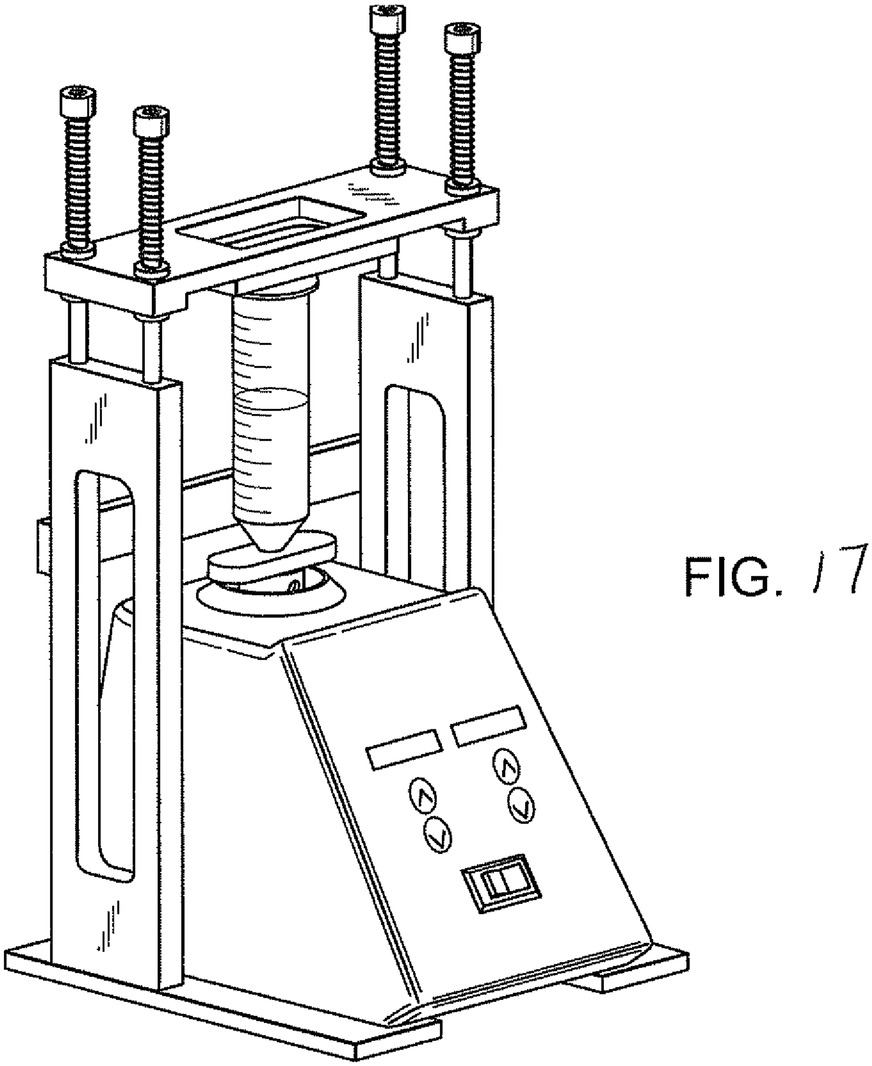
FIG. 17 illustrates an instrument for making an emulsion.
Figure 18:
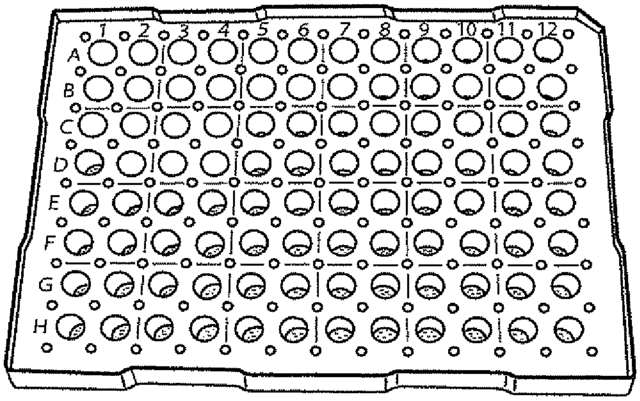
FIG. 18 illustrates a microtiter plate with an emulsion in each of the wells.
Figure 19:
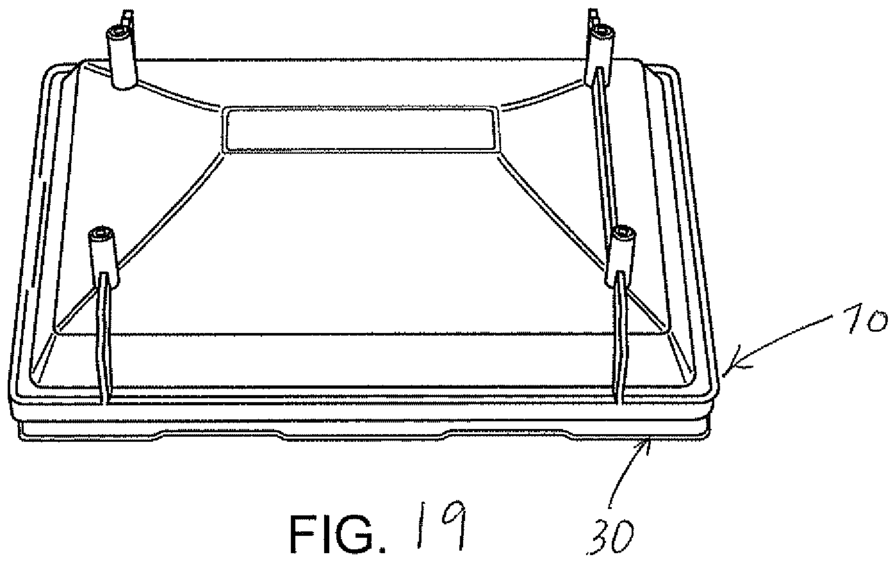
FIG. 19 illustrates a receptacle resting in an inverted position over the microtiter plate of FIG. 18.
Figure 20:
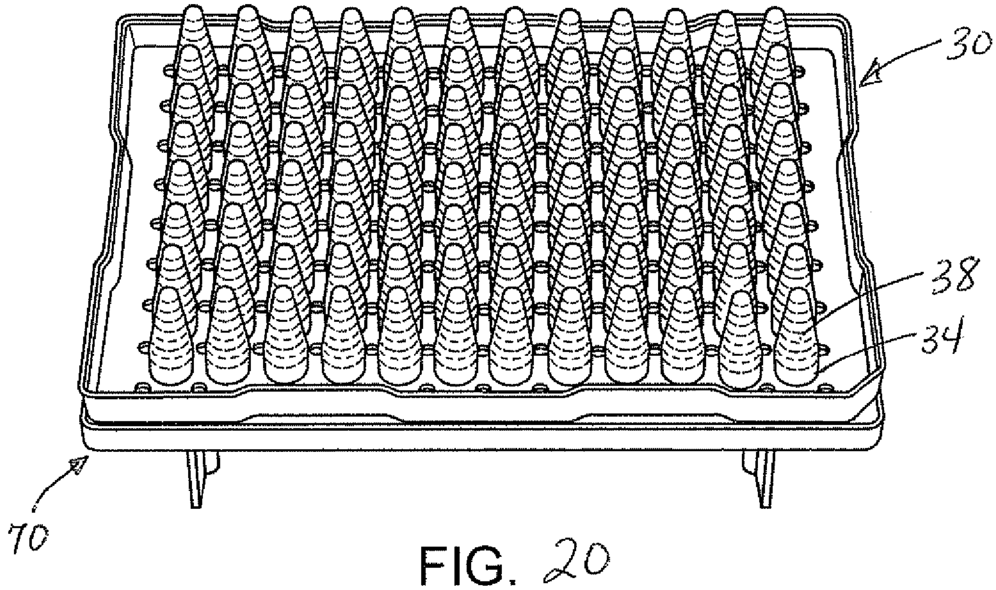
FIG. 20 illustrates the receptacle and microtiter plate of FIG. 19 inverted as an assembly.

FIG. 12 illustrates receptacle 82 from underneath, highlighting four support posts 92 and six stacking features 94. Stacking features 94 include vertical and horizontal surfaces, illustrated as 94A and 94B, respectively, in FIG. 13. Stacking features 94 are dimensioned such that vertical surface 94A mates with the inner vertical surface of vertically projecting wall 86, and horizontal surface 94B mates with a top surface of vertically projecting wall 86. As illustrated in FIG. 16, when one receptacle 84 is set on top of another receptacle 84, the support posts 92 and a portion of the collection reservoir fits within the collection reservoir of the other, reducing the amount of space occupied by the two independently. Such a configuration can be beneficial when shipping receptacles.

Figure 13:
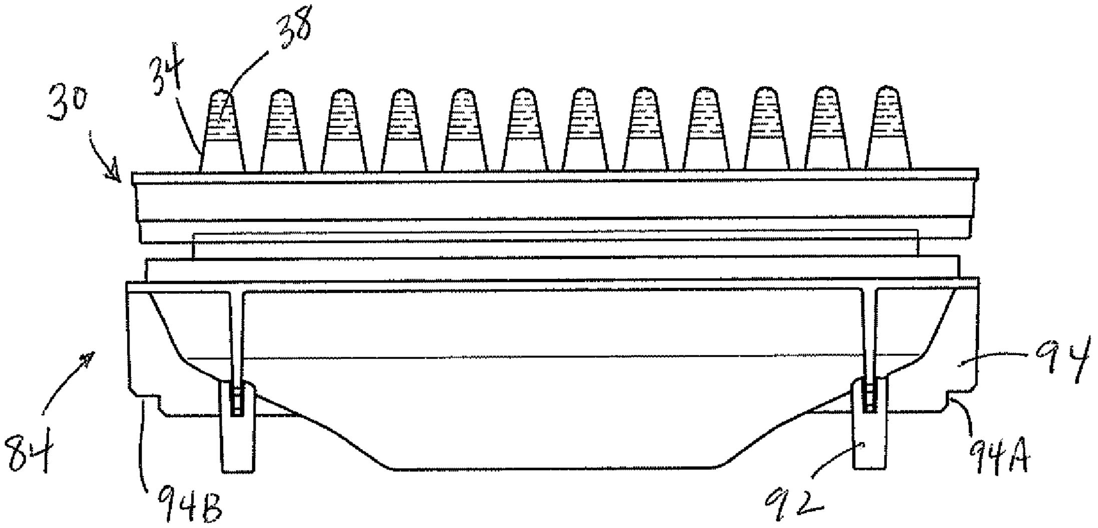
FIG. 13 illustrates a microtiter plate with emulsion inverted over a receptacle of FIG. 11.
Figure 14:
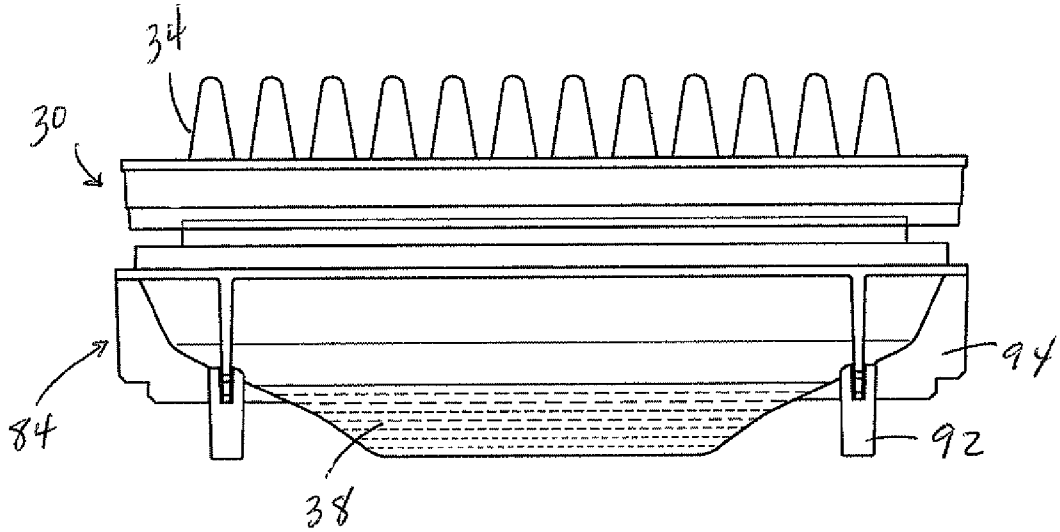
FIG. 14 illustrates the microtiter plate and receptacle of FIG. 13 after centrifugation, where the emulsion has collected in a trough of the receptacle.

FIGS. 13 and 14 illustrate before and after states of an assembly of a microtiter plate 30 and a receptacle 84 on which a method of removing a liquid by centrifugation has been performed. Before centrifugation, a liquid 38 present in each of wells 34 of microtiter plate 30 does not flow out of the wells when microtiter plate 30 is inverted over receptacle 84. Centrifugation of the assembled microtiter plate and receptacle removes the liquid 38 from the wells 34 and gathers it in a continuous volume in a trough of receptacle 84.

Figure 21:
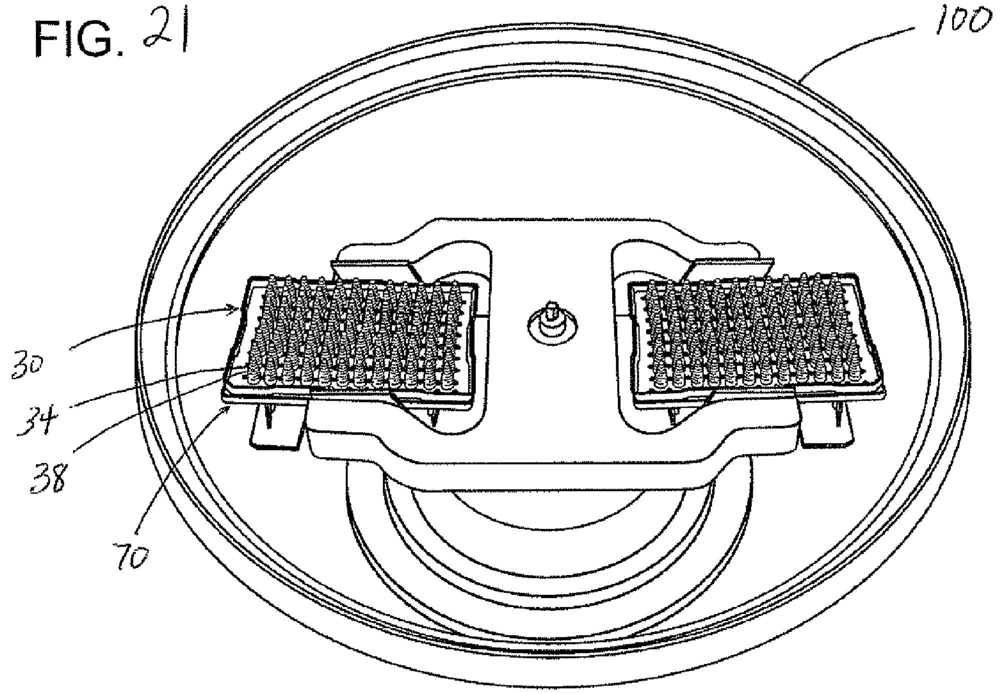
FIG. 21 illustrates two inverted assemblies of FIG. 20 as placed in a microplate centrifuge, prior to centrifugation.
Figure 22:
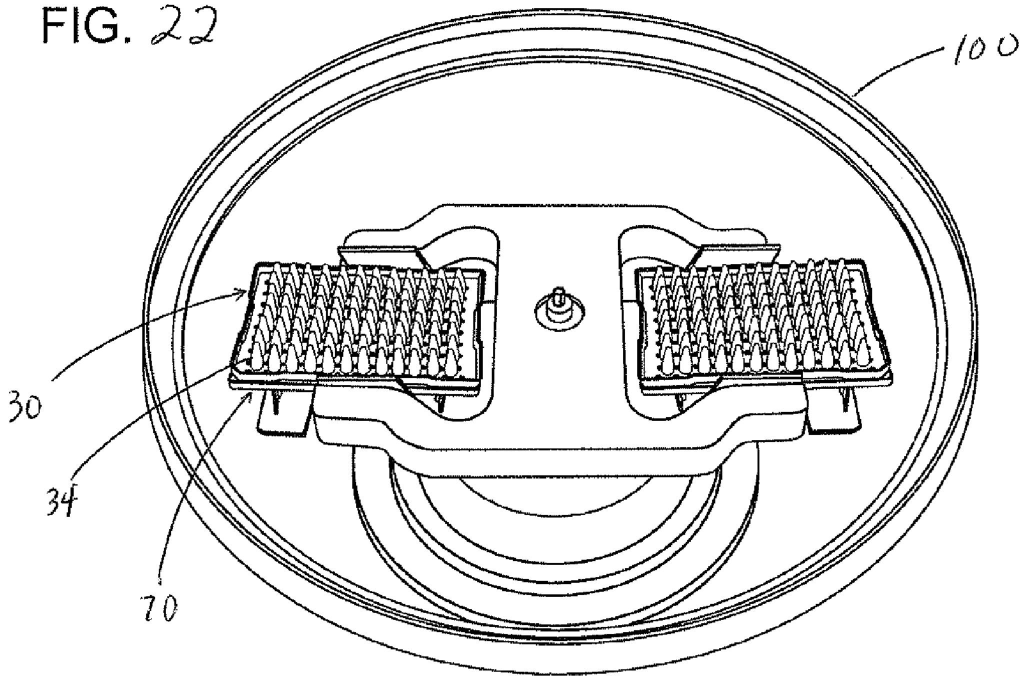
FIG. 22 illustrates the two inverted assemblies of FIG. 21 in the microplate centrifuge after centrifugation.

FIGS. 21 and 22 also illustrate before and after centrifugation of the assemblies. In FIG. 21, microtiter plate centrifuge 100 has an inverted microtiter plate 30 with an individual volume of liquid 39 in each of wells 34 assembled to a receptacle 70 positioned in each of its two buckets. FIG. 22 illustrates the centrifuge 100 with the assemblies after centrifugation, where the wells 34 of microliter plate 30 are empty and liquid 38 is in a continuous volume (not shown) in receptacle 70.

Figure 23:
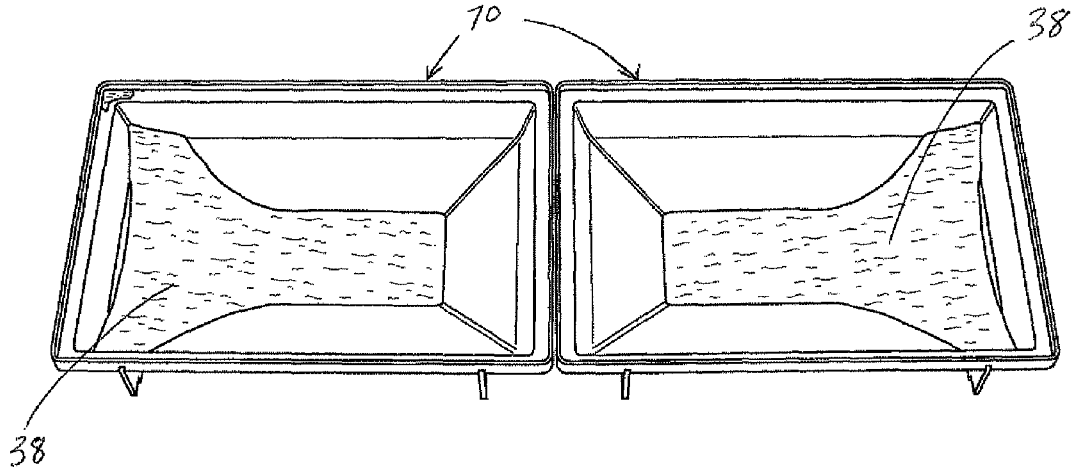
FIG. 23 illustrates the two inverted receptacle of FIG. 22 after removing them from the centrifuge and removing the microtiter plates from the assemblies.
Figure 24:
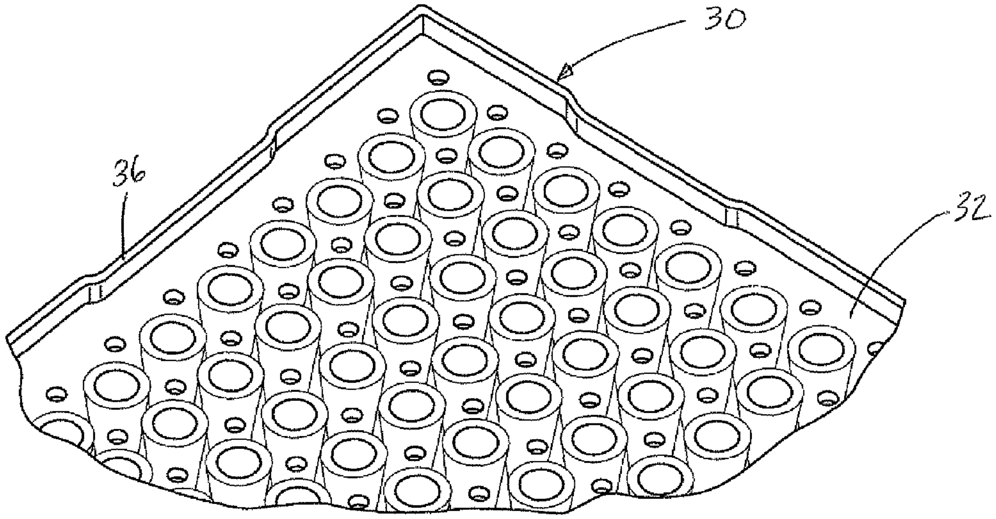
FIG. 24 illustrates a perimetric ridge on a microtiter plate.

After removing the assemblies from the centrifuge 100, the empty microtiter plates were removed from on top of the receptacles. FIG. 23 illustrates the disposition of the continuous volume of liquid 38 in the receptacles 70.

Figure 25:
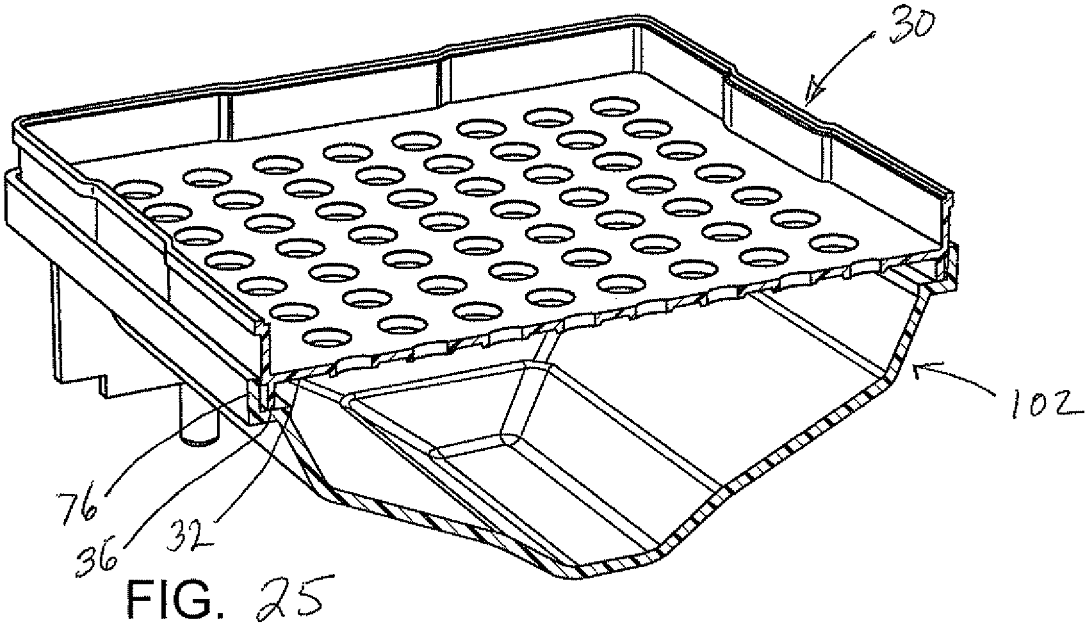
FIG. 25 illustrates one embodiment of a receptacle assembled to an inverted skirted plate with a perimetric ridge.
Figure 26:
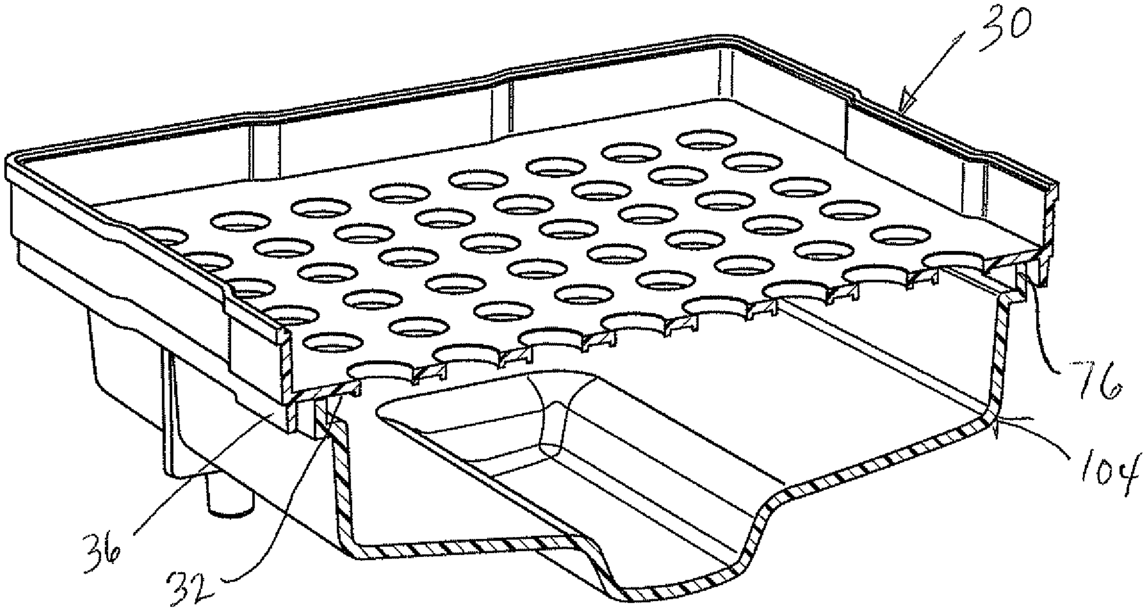
FIG. 26 illustrates another embodiment of a receptacle assembled to the inverted skirted plate with a perimetric ridge.

FIGS. 25 and 26 illustrate a skirted microtiter plate 30 with through-holes instead of wells. Microtiter plate 30 has a planar surface 32, surrounded by a perimetric ridge 36. FIG. 25 illustrates an embodiment of a receptacle 102 similar to receptacle 70 in that it too has a perimetric wall 76. Perimetric wall 76 of receptacle 102 is dimensioned such that it surrounds perimetric ridge 36 of microtiter plate 30. Receptacle 102 may also capture the perimeter of microliter plates without perimetric ridges, and perimetric wall 76 will function to limit the relative motion in the x-y plane between the microliter plate and the receptacle 102. A "top" (now bottom, due to the inversion) surface of perimetric ridge 36 is in contact with the annular surface area of receptacle 102 and planar surface 32 does not contact receptacle 102. FIG. 26 illustrates another receptacle 104 with a perimetric wall 76. However, perimetric wall 76 of receptacle 104 is dimensioned to fit inside the perimetric ridge 36 of microtiter plate 30, such that microliter plate 30 rests on a top surface of perimetric wall 76 in contact with planar surface 32 of microtiter plate 32. The "top" surface of perimetric ridge 36 does not contact receptacle 104. Receptacle 104, if assembled to a microtiter plate without a perimetric ridge would not limit the relative motion therebetween, if the top surface of such a microtiter plate was purely planar.

Other embodiments of the present teachings will be apparent to those skilled in the art from consideration of the present specification and practice of the present teachings disclosed herein. It is intended that the specification and examples be considered as exemplary only and not be limiting. All cited references, patents, and patent applications are incorporated in their entireties herein by reference.

What is claimed is:

1. A method of collecting liquid from a microtiter plate, the method comprising:

providing a microtiter plate having a top planar surface and a plurality of material retention regions containing liquid, each material retention region of the plurality of material retention regions having an open end proximal to the top planar surface and a closed end opposite the open end, wherein the microtiter plate contains a total volume of liquid split between the plurality of material retention regions and applied through the open end of the each material retention region of the plurality of material retention regions, each of the plurality of material retention regions containing an individual, discrete volume of liquid, and each individual, discrete volume of liquid being less than the total volume;

coupling a receptacle having a perimetric wall, which defines an opening, and an empty volume equal to or greater than the total volume of the microtiter plate with the opening facing the top planar surface of the microtiter plate; and centrifuging liquid from the microtiter plate to the receptacle, such that the individual, discrete volumes of liquid from the plurality of material retention regions pass through the open ends of the plurality of material retention regions and through the opening and collect in the receptacle as one continuous volume of liquid.

2. The method of claim 1, wherein coupling comprises contacting a first side of a coupling frame with the microtiter plate and contacting a second side of the coupling frame with the receptacle.

3. The method of claim 2, wherein coupling further comprises moving a first mechanical stop projecting from the coupling frame in the z direction inside a perimeteric ridge of the microtiter plate, thereby limiting the relative motion between the coupling frame and the microtiter plate in the x-y plane, the x-y plane being parallel to the top planar surface and the z direction being normal to the top planar surface.

4. The method of claim 2, wherein coupling further comprises moving a first mechanical stop projecting from the coupling frame in the z direction outside the perimeter of the microtiter plate, thereby limiting the relative motion between the coupling frame and the microtiter plate in the x-y plane, the x-y plane being parallel to the top planar surface and the z direction being normal to the top planar surface.

5. The method of claim 3, wherein the first mechanical stop comprises a single ring-like projection.

6. The method of claim 3, wherein the first mechanical stop comprises four separate projections.

7. The method of claim 3, wherein coupling further comprises moving a second mechanical stop projecting from the coupling frame in the z direction into the opening of the receptacle, thereby limiting the relative motion between the coupling frame and the receptacle in the x-y plane.

8. The method of claim 3, wherein coupling further comprises moving a second mechanical stop projecting from the coupling frame in the z direction outside the opening of the receptacle, thereby limiting the relative motion between the coupling frame and the receptacle in the x-y plane.

9. The method of claim 7, wherein the second mechanical stop comprises a single ringlike projection.

10. The method of claim 7, wherein the first mechanical stop comprises four separate projections.

11. The method of claim 1, wherein coupling comprises moving a mechanical stop projecting from the receptacle in the z direction inside a perimeteric ridge of the microtiter plate, thereby limiting the relative motion between the receptacle and the microtiter plate in the x-y plane, the x-y plane being parallel to the top planar surface and the z direction being normal to the top planar surface.

12. The method of claim 1, wherein coupling comprises moving a mechanical stop projecting from the receptacle in the z direction outside the perimeter of the microtiter plate, thereby limiting the relative motion between the receptacle and the microtiter plate in the x-y plane, the x-y plane being parallel to the top planar surface and the z direction being normal to the top planar surface.

13. The method of claim 11, wherein the second mechanical stop comprises a single ring-like projection.

14. The method of claim 11, wherein the first mechanical stop comprises four separate projections.

15. The method of claim 1, wherein coupling comprises capturing a skirt of the microtiter plate with a mechanical stop, thereby limiting the relative motion between the receptacle and the microtiter plate in at least one of the x-z plane and the y-z plane, wherein x and y are directions orthogonal to each other and parallel to the top planar surface and z is a direction normal to the top planar surface.

16. The method of claim 1 further comprising inverting the microtiter plate while coupled to the receptacle such that the top planar surface of the microtiter plate is facing down.

17. The method of claim 16 further comprising placing the inverted microtiter plate and receptacle into a microtiter plate centrifuge.

18. The method of claim 1, wherein a material retention region is a well.

19. The method of claim 1 further comprising filling at least two of the plurality of material retention regions with liquid, such that the first of the at least two material retention regions contains a first, individual, discrete volume of a composition and the second of the at least two material retention regions contains a second, individual, discrete volume of the same composition.

20. The method of claim 19, wherein the composition is a water-in-oil emulsion.

21. The method of claim 20, wherein a plurality of discontinuous volumes of water in the water-in-oil emulsion each contain a bead.

22. The method of claim 4, wherein the first mechanical stop comprises a single ring-like projection.

23. The method of claim 4, wherein the first mechanical stop comprises four separate projections.

24. The method of claim 4, wherein coupling further comprises moving a second mechanical stop projecting from the coupling frame in the z direction into the opening of the receptacle, thereby limiting the relative motion between the coupling frame and the receptacle in the x-y plane.

25. The method of claim 4, wherein coupling further comprises moving a second mechanical stop projecting from the coupling frame in the z direction outside the opening of the receptacle, thereby limiting the relative motion between the coupling frame and the receptacle in the x-y plane.

26. The method of claim 8, wherein the second mechanical stop comprises a single ringlike projection.

27. The method of claim 8, wherein the first mechanical stop comprises four separate projections.

28. The method of claim 12, wherein the second mechanical stop comprises a single ring-like projection.

29. The method of claim 12, wherein the first mechanical stop comprises four separate projections.

* * * * *